United States Patent

[11] 3,633,700

[72] Inventors Ralph W. Matthews
    New Berlin;
    Gerald W. Bernhoft, Wauwatosa; Michael R. Schmidt, Hales Corners, all of Wis.
[21] Appl. No. 886,913
[22] Filed Dec. 22, 1969
[45] Patented Jan. 11, 1972
[73] Assignee Allis-Chalmers Manufacturing Company
    Milwaukee, Wis.

[54] DECELERATION CONTROL SYSTEM FOR HYDROSTATIC DRIVE VEHICLES
    6 Claims, 4 Drawing Figs.

[52] U.S. Cl. .................................................. 180/66 R,
                                                              60/153 R
[51] Int. Cl. ................................................ B60k 17/10,
                                                            B60k 21/04
[50] Field of Search .................................... 180/66;
                                   60/53 R, 53 A, 53 B, 53 C, 53 D

[56] References Cited
    UNITED STATES PATENTS
    1,238,927  9/1917  Manly .......................... 60/53
    2,773,352 12/1956  Fujii ............................ 60/53
    3,152,445 10/1964  Weisenbach ................ 60/53
    FOREIGN PATENTS
    978,661 12/1964  Great Britain ............... 60/53

Primary Examiner—Benjamin Hersh
Assistant Examiner—Milton L. Smith
Attorneys—Kenneth C. McKivett, Robert B. Benson and Charles L. Schwab ABSTRACT: A combine harvester having a multiple-speed range mechanical transmission combined with a hydrostatic transmission and in providing valve means for the hydrostatic transmission which valve means is connected to the mechanical transmission so that pressure fluid is supplied to the hydrostatic transmission resulting in acceleration/deceleration of the harvester commensurate with the particular speed range selected.

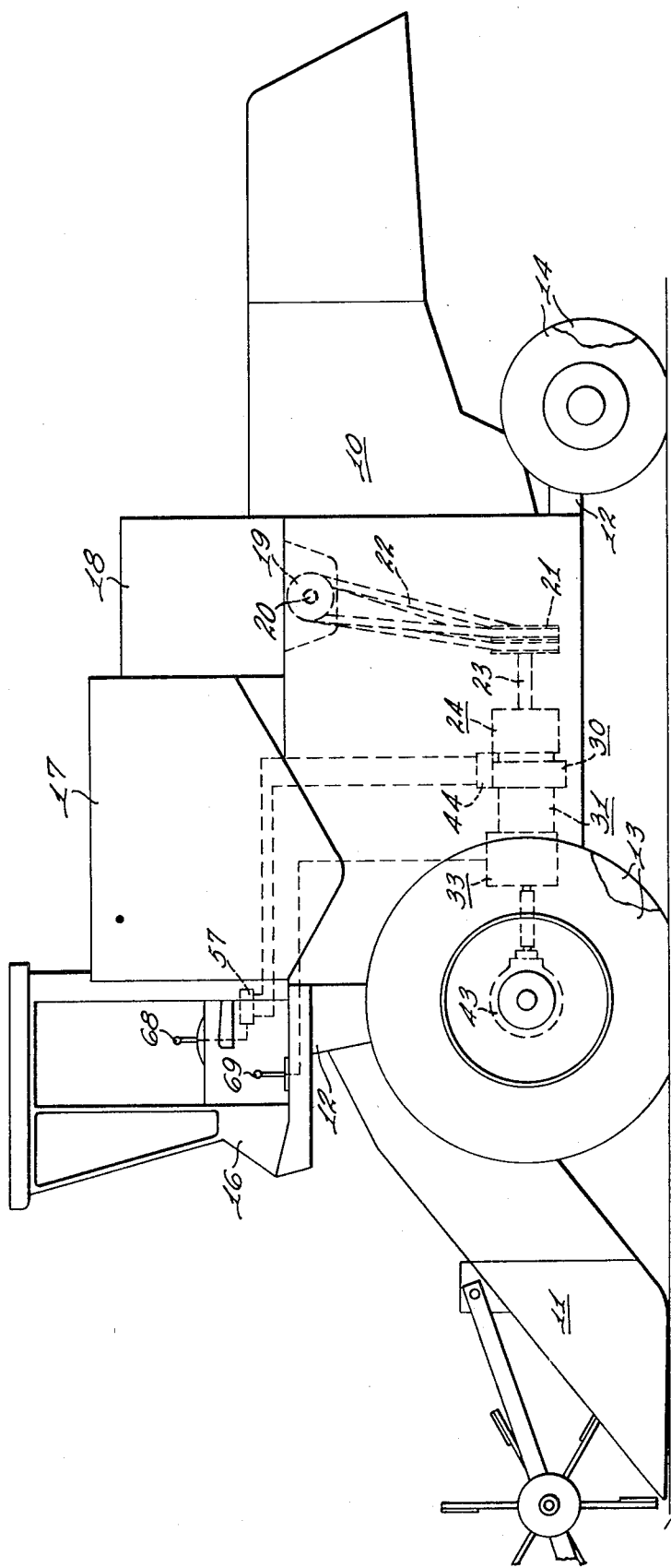

Inventors
Ralph W. Matthews
Gerald W. Bernhoft
Michael R. Schmidt
By Kenneth C. Lachniet
Attorneys

DECELERATION CONTROL SYSTEM FOR HYDROSTATIC DRIVE VEHICLES

This invention is concerned with an acceleration/deceleration control system for hydrostatic drive vehicles. More particularly, it is concerned with a combine harvester having a three forward speed mechanical transmission combined with a hydrostatic drive and a valve member for the hydrostatic drive being positioned by the mechanical transmission to provide the optimum acceleration/deceleration for the particular speed range selected.

In the prior art, instead of providing for the optimum acceleration/deceleration for each speed, a compromise has been provided wherein the acceleration/deceleration is the same for any speed selected but accordingly not the optimum for all speeds. Combine harvesters are massive pieces of machinery with relatively high centers of gravity and it is important that they be constructed with consideration of stability for deceleration.

A further object of this invention is to provide in a self-propelled combine harvester having a combined mechanical and hydrostatic transmission a valve for controlling the volume of a variable volume hydraulic pump wherein the rate of controlling such pump will depend upon the gear ratio in which the mechanical transmission is being operated and the weight and center of gravity of the particular machine being used.

A further object is to provide in a self-propelled vehicle having a combined mechanical and hydrostatic transmission, a valve for controlling the rate of change of displacement in a hydraulic pump, with said valve having a spool biased to a minimum acceleration/deceleration position of said valve.

A further object of this invention is to provide in a self-propelled combine harvester having a mechanical and hydrostatic transmission, a valve for controlling the rate of positioning the variable delivery means in a hydraulic pump in such transmission wherein the rate of changing the displacement of such pump will depend upon the gear ratio which has been selected in the mechanical transmission and such valve is provided with a reversible spool for providing a series of different-sized orifices to match hydraulic control rates with the gear ratio selected and when reversed providing an additional series of orifices adapted for a machine which has optional equipment of different weight and/or location.

Other objects and advantages will become apparent upon reading the following description in light of the accompanying drawings, wherein:

FIG. 1 is a side elevation view of a self-propelled combine harvester embodying the invention;

FIG. 4 is a side elevation view of a corn head attachment which may be substituted for the grain header shown in FIG. 1.

Figure 3:
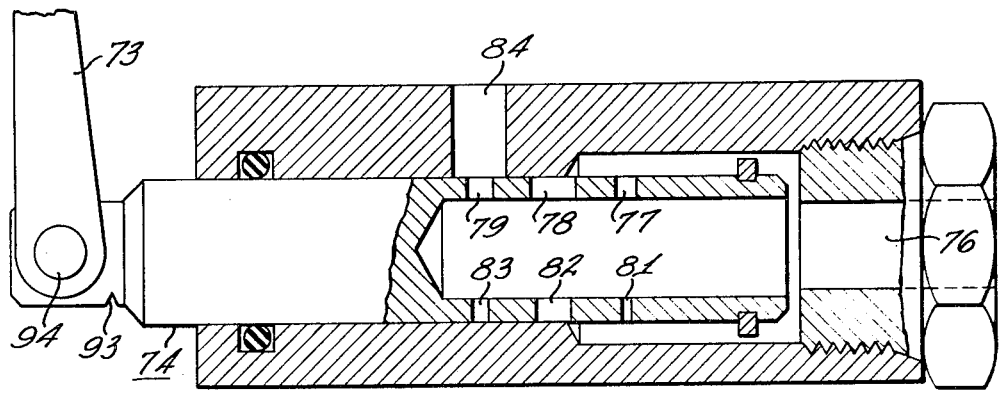
FIG. 3 is a section view of the acceleration/deceleration control valve.

Referring to FIG. 1, the reference numeral 10 is used to designate a self-propelled combine harvester equipped with a harvesting header 11 mounted on the forward end thereof. The harvester includes a frame structure 12 mounted at the front end on a pair of traction wheels 13 and at the rear end on a pair of dirigible wheels 14. An operator's platform 16 is mounted on frame 12 at the forward end thereof. A harvested grain tank 17 is mounted rearwardly of the operator's plateform 16 and an internal combustion engine 18 is mounted rearwardly of the grain tank. Engine 18 has a sheave 19 attached to the outboard end of its drive shaft 20 and sheave 19 is drivingly connected to sheave 21 by belt 22. Sheave 21 is attached to shaft 23 which is connected to a hydrostatic transmission pump 24. A portion of shaft 23 is drivingly connected to pumping member 26 (see FIG. 2) of hydraulic pump 24. Hydraulic pump 24 provides pressurized hydraulic fluid through manifold housing 30 for driving hydraulic motor 31 which in turn drives shaft 32 of mechanical gear shift transmission 33. Gears 34, 36 and 37 are attached to slide 35 which is slidably mounted on shaft 32 and driven thereby and these gears may be selectively engaged with gears 38, 39 and 41, respectively, mounted on shaft 42 to provide a three-range speed change transmission. Shaft 42 is drivingly connected with a conventional differential drive 43 for driving traction wheels 13.

A hydraulic cylinder 44 is mounted on hydraulic manifold housing 30 and includes a piston 46 having a piston rod 47 pivotally attached to one end of a link 48 having its other end pivotally attached to a midportion of member 49. The lower end of member 49 is attached to a shaft 51 upon which pumping member or variable volume means 26 is attached. A servo mechanism is provided for maintaining the position of variable volume means 26 in adjusted position. The servo mechanism includes having the upper end of member 49 provided with a pivot pin 52 which is slidably received in slot 53 of depending member 54 attached to slidable jacket 56 of valve 57.

Valve 57 is a three position valve. Valve 57 is provided with a three position spool 61 having a neutral position 62, a portion 63 for delivering hydraulic fluid to the base end of cylinder 44 and a portion 64 for delivering hydraulic fluid to the rod end of cylinder 44.

The right-hand end of spool 61 is attached to a rod 66 having its outboard end pivotally connected to one end of a link 67. The other end of link 67 is pivotally connected to the lower end of operating lever 68 which is pivotally connected to frame 12 for operation from the operator's platform for controlling the speed and direction of the harvester. The letter F stands for forward speed and the further lever 68 is moved toward F the faster the speed. The letter R stands for reverse and the further lever 68 is moved toward R the faster will be the reverse speed. N stands for neutral and when lever 68 is in this position, the variable volume means 26 will provide zero flow to motor 31 and the harvester would have no forward or reverse movement.

Mechanical change speed transmission 33 is provided with a pivotally mounted operating lever 69 which is connected at its lower end with sliding rod 71 so that as the upper end of lever 69 is moved to the right or left rod 71 is slid in the opposite direction. Rod 71 is provided with depending fork members 70 which are engaged with slide 35 mounted on shaft 32.

The left-hand end of rod 71 is pivotally connected to one end of link 72 which has its other end pivotally connected to one end of lever 73. Lever 73 is pivoted at a midportion on frame 12 and has its other end pivotally connected to the left-hand end of spool 74. Spool 74 is provided (see FIG. 3) with a hydraulic fluid entrance end 76 connecting with three upper orifices 77, 78 and 79 and three lower orifices 81, 82 and 83. As shown in FIG. 3, orifice 79 is aligned with outlet 84. In the event the linkage connected to spool 74 should be disconnected, fluid pressure on the right-hand end of spool 74 would cause spool 74 to move toward the left resulting in an alignment of orifice 77 with outlet 84. Orifice 77 is the smallest of the three orifices 77, 78 and 79 so orifice 77 permits the smallest flow of hydraulic fluid therethrough so in the case of linkage failure hydraulic bias will position spool 74 with orifice 77 aligned with outlet 84 which will provide the variable volume means 26 with the minimum deceleration for maximum stability.

Figure 2:
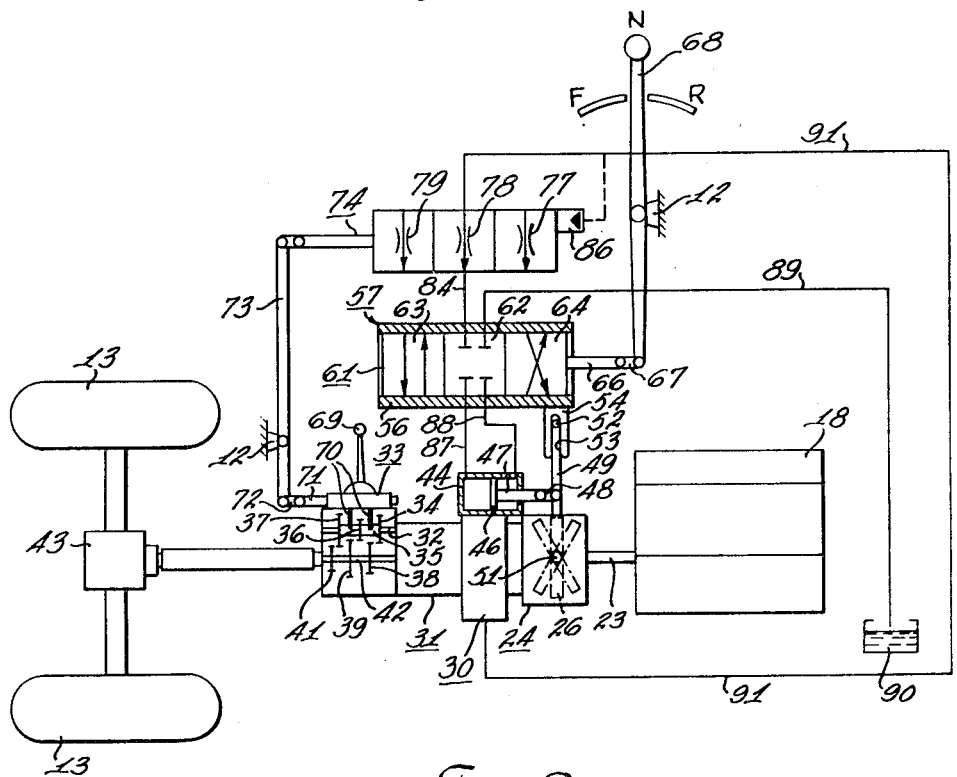
FIG. 2 is a schematic view showing the drive of the harvester.

Referring to FIG. 2, if the operator of the vehicle wishes to operate in the fastest speed range, as for example, when traveling on a highway between jobs, he would shift lever 69 forwardly (to the left) which would cause the upper end of lever 73 to move to the left and result in orifice 78 being aligned with outlet 84. This movement of spool 74 is against the hydraulic bias 86 as indicated in FIG. 2. This forward shifting of lever 69 would cause gear 37 to engage with gear 41 providing the highest gear ratio for driving shaft 42. The operator would also shift lever 68 forwardly which results in spool 61 moving to the right to align spool portion 63 so that passage 84 is aligned with passage 87 leading to the base end of hydraulic cylinder 44 and passage 88 connected to the rod end of cylinder 44 is aligned with passage 89 connected to sump 90. Hydraulic fluid will now move from manifold housing 30 through line 91, through orifice 78, through passage 84, through spool section 63, through passage 87 to the base end of hydraulic cylinder 44. This hydraulic fluid would move piston 46 to the right rotating shaft 51 in a clockwise direction to an extent determined by the position to which lever 68 is moved. Variable volume means 26 is attached to shaft 51 for movement therewith. This movement of piston rod 47 acting through link 48 and member 49 while positioning the variable volume means 26 for a desired speed also functions as a servo mechanism and positions jacket 56 to return valve 57 to the neutral position shown in FIG. 2. This is accomplished by pin 52 attached to the upper end of member 49 contacting yoke 54 and moving cylinder 56 to the right to stop any further flow of hydraulic fluid to cylinder 44 thereby maintaining the desired setting of variable volume means 26.

In the same manner, if an intermediate range of speed was desired, the operator would shift lever 69 engaging gear 34 with gear 38. This movement of member 71 would result in orifice 79 being positioned in alignment with opening 84 resulting in a medium rate of change of variable volume means 26 when operating lever 68 is actuated.

Similarly, if the slowest speed range is desired, the operator would shift lever 69 engaging gears 36 and 39 this shifting of gears would result in orifice 77 being lined up with outlet 84 to provide a minimum rate of change of variable volume means 26 when lever 68 is actuated.

Referring to FIG. 3, it is seen that spool 74 is provided with a notch 93 adjacent the end thereof. This notch 93 is provided for the purpose of notifying the operator that when the notch is down as shown in FIG. 3, the high range of acceleration is being used and when the notch is up, the low range of acceleration is being used. It is apparent that orifices 77, 78 and 79 are larger than orifices 81, 82 and 83. Orifices 81, 82 and 83 can readily be made usable by merely removing pin 94, disconnecting lever 73 from spool 74, rotating spool 74 180° about its principal axis, reconnecting lever 73 to spool 74 by inserting pin 94 into complementary openings in lever 73 and spool 74. Spool 74 is now adapted for providing a lower acceleration as for a combine harvester equipped with a corn head 95 (see FIG. 4) in place of the lighter grain head 11 shown in FIG. 1.

The embodiments of the invention in which an exclusive property or privilege is claimed are defined as follows:

1. In a combination in a self-propelled machine having a hydraulic drive operatively connected to a mechanical change speed transmission including a plurality of speed ranges selectable for driving said machine, said hydraulic drive including a variable volume pump, a bidirectional hydraulic motor operatively connected between said transmission and said pump, first valve means selectively movable to forward, reverse and neutral positions and being operatively connected to said pump for controlling the displacement of same, servo mechanism operatively connected to said pump for returning said first valve means to neutral position following a positioning of said first valve means in forward or reverse positions, and movement of said pump to a desired displacement and additional valve means actuated by a positioning of said change speed mechanism to a desired speed position to provide a selected rate of hydraulic flow through said first valve means to adjust said pump at a rate to provide a desired output thereof, said pump driving said motor with said desired output, and said motor driving said machine through said change transmission at a rate determined by said desired output and commensurate with the selected speed range of said change speed transmission for providing optimum acceleration or deceleration of the harvester for such range.

2. In the combination recited in claim 1 and wherein said additional valve means includes a spool pressure loaded to assume said lowest acceleration/deceleration position in the event the connection between said additional valve means and said change speed transmission is inoperative.

3. In the combination recited in claim 2 and wherein said pump comprises a hydraulic cylinder having a piston operatively connected to the variable volume means of said pump and said first valve means comprises a spool surrounded by a movable jacket, and wherein said servo mechanism is connected between said variable volume means and said movable jacket whereby said spool of said first valve means can be moved to a desired setting of the variable volume means followed by a movement of said jacket responsive to the movement of said variable volume means so that the setting of the variable volume means is maintained but said first valve means is repositioned to a neutral position.

4. The combination recited in claim 2 wherein said change speed transmission is provided with multiple-speed ranges and said additional valve means is provided with a spool connected to said transmission operating member, said spool being provided with corresponding orifices, one for each speed range to provide optimum acceleration and deceleration for each speed range, said spool being moved when said operating member is moved to align the proper orifice for the speed range selected.

5. The combination recited in claim 3 and wherein said change speed transmission is provided with three-speed ranges obtained by shifting said transmission by movement of said operating member on but one shift rail, said operating member being connected to said spool of said additional valve means so that said spool is shifted as said transmission is shifted.

6. The combination recited in claim 4 and wherein said spool is provided with three different sized orifices for use with a mobile machine having lightweight optional equipment and wherein said spool is adapted to be disconnected and rotated 180° about its principal axis and reconnected for providing additionally different orifices to provide optimum acceleration and deceleration for a machine having heavy optional equipment.

* * * * *